(12) United States Patent
Kikuchi et al.

(10) Patent No.: US 6,358,031 B1
(45) Date of Patent: Mar. 19, 2002

(54) GOLF BALL-SHAPING MOLD AND CAVITY DIE

(75) Inventors: Masaaki Kikuchi; Takeshi Asakura; Haruki Shinagawa; Hiroaki Tanaka, all of Hyogo (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 09/608,001

(22) Filed: Jun. 30, 2000

(30) Foreign Application Priority Data

Jul. 6, 1999 (JP) ............................... 11-191231

(51) Int. Cl.[7] ..................... B29C 33/04; B29C 45/73
(52) U.S. Cl. ................... 425/116; 249/79; 425/548; 425/552
(58) Field of Search ................ 249/79, 81; 425/116, 425/547, 548, 552, 407, 408; 264/279.1

(56) References Cited

U.S. PATENT DOCUMENTS

| | | | | |
|---|---|---|---|---|
| 1,505,816 A | * | 8/1924 | Steele | |
| 2,361,348 A | * | 10/1944 | Dickson et al. | 425/116 |
| 2,376,085 A | * | 5/1945 | Radford et al. | 425/116 |
| 4,508,309 A | * | 4/1985 | Brown | 249/81 |
| 5,259,752 A | * | 11/1993 | Scolamiero et al. | 425/406 |
| 5,725,891 A | * | 3/1998 | Reid, Jr. | 425/407 |
| 5,827,548 A | * | 10/1998 | Lavallee et al. | 425/116 |

FOREIGN PATENT DOCUMENTS

| | | | |
|---|---|---|---|
| JP | 7-137038 | | 5/1995 |
| JP | 09000662 A | * | 1/1997 |
| JP | 09011238 A | * | 1/1997 |

* cited by examiner

*Primary Examiner*—Robert Davis
(74) *Attorney, Agent, or Firm*—Armstrong, Westerman & Hattori, LLP

(57) ABSTRACT

A cavity die (1) has a flange part (5), a body (7), and a cavity surface (9). An annular groove (11) is formed on a periphery of the body (7). A region surrounded with the annular groove (11) and a retaining plate forms a boundary flow path. An inner flow path (17) is formed inside the body (7). The inner flow path (17) is linear. Both ends of the inner flow path (17) are open on a peripheral surface of the body (7) to form openings (19) thereon. A heating medium flows into the boundary flow path and the inner flow path (17) through a flow path formed on the retaining plate. Thereby, the temperature of the cavity die (1) is adjusted.

5 Claims, 8 Drawing Sheets

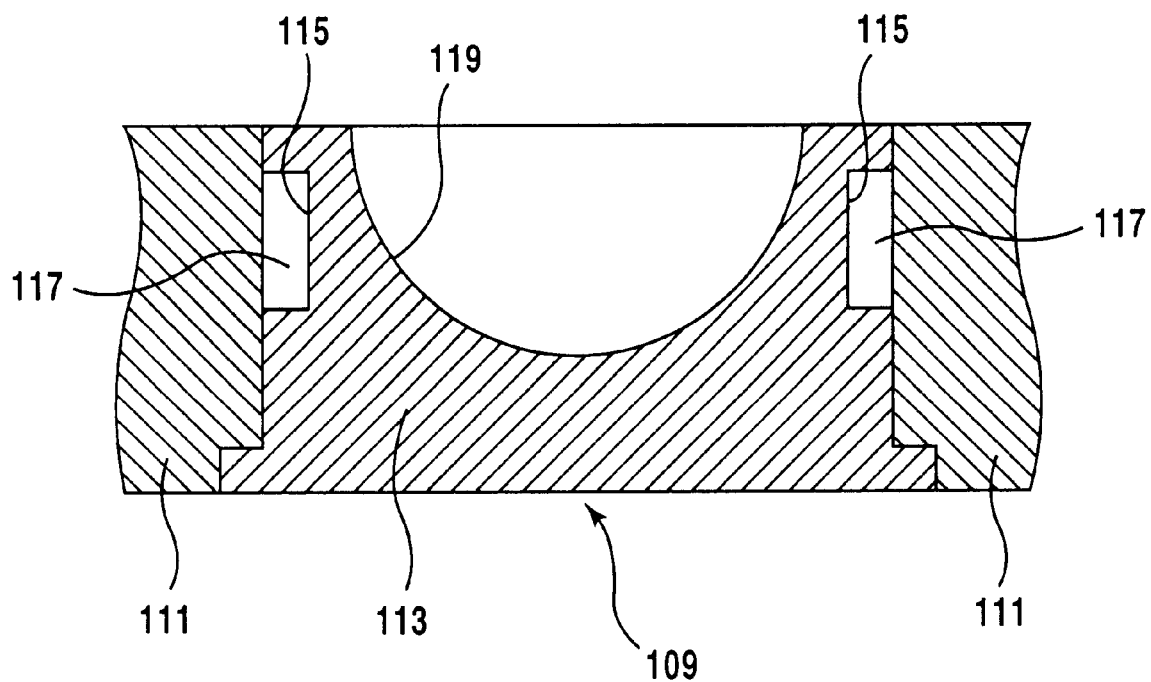

GOLF BALL-SHAPING MOLD AND CAVITY DIE

BACKGROUND OF THE INVENTION

1. Field of the Invention

The present invention relates to a golf ball-shaping mold and cavity die to be used to manufacture a golf ball. More particularly, the present invention relates to improvement of a flow path for flowing a temperature-adjusting fluid therethrough.

2. Description of the Related Art

In the molding process of a golf ball such as a two-piece golf ball, a multi-piece golf ball, and a thread-wound golf ball, its core is covered with a cover. As the method of covering the core, injection molding method or compression molding method is adopted. In both molding methods, a pair of upper and lower cavity dies is used. Each cavity die has a semispherical cavity surface. Thus, the two cavity surfaces form a spherical cavity. In the injection molding method, a heated/melted material (normally, thermoplastic resin) of the material of the cover is injected on the peripheral surface of the core, with the core held in the cavity. In the compression molding method, the core and the material of the cover are introduced into the cavity to heat and compress them. The one-piece golf ball that is mainly supplied to a golf practice range does not have the cover but consists of solid rubber. A pair of upper and lower cavity dies is also used to shape the one-piece golf ball. In the case of the one-piece golf ball, a rubber material is introduced into the cavity and heated and compressed (compression molding).

To obtain high-quality golf balls in these molding methods, temperature adjustment of the cavity die is important. The temperature control can be achieved by a heating medium flowing through a flow path formed in a mold including a cavity die. For example, the temperature of the cavity die is raised by a heated heating medium flowing through the flow path, whereas the temperature of the cavity die is lowered by a cooled heating medium flowing therethrough. Water (hot water) is generally used as the heating medium.

In the injection molding method, the temperature of the cavity die becomes high because high-temperature thermoplastic resin is injected thereinto. Thus, cooling the cavity die is important. When the cavity die has a high temperature, the injected thermoplastic resin (cover) is not cooled sufficiently. In this case, when the shaped golf ball is ejected from the cavity with an ejection pin, the soft cover is damaged with the tip of the ejection pin to generate a so-called pin mark. The generation of the pin mark can be prevented by cooling the golf ball for a long time, which makes a golf ball-shaping cycle long and deteriorates productivity.

FIG. 5 is a sectional view showing a conventional golf ball-shaping mold. The mold has a cavity die 101 and a retaining plate 103 in which the cavity die 101 is fitted. Heating medium flow paths 105 are formed in the retaining plate 103. In this mold, there is a long distance between the flow path 105 and a cavity surface 107. Thus, heat exchange cannot be made sufficiently, and hence the temperature adjustment of the cavity die cannot be sufficiently made.

FIG. 6 is a sectional view showing another conventional golf ball-shaping mold. The mold has a cavity die 109 and a retaining plate 111 in which the cavity die 109 is fitted. An annular groove 115 is formed on the periphery of a body 113 of the cavity die 109. The portion surrounded with the annular groove 115 and the retaining plate 111 serves as a flow path 117. In the mold, the side portion of a cavity surface 119 is near to the flow path 117. Thus the temperature adjustment of the side portion is efficiently accomplished, whereas the neighborhood of the bottom portion of the cavity surface 119 is far from the flow path 117 and thus the temperature adjustment thereof is not efficiently accomplished. If the mold is used as the injection molding mold, an ejection pin is formed near the bottom portion of the cavity surface 119. Therefore, when the neighborhood of the bottom portion of the cavity surface 119 is insufficiently cooled, the pin mark is liable to be generated.

A cavity die having an annular flow path formed in its body is disclosed in Japanese Patent Application Laid-Open No. 7-137038. Because in the cavity die, the distance (shortest distance) between the cavity surface and the flow path is short, heat exchange can be made efficiently.

The annular flow path cannot be machined with an ordinary cutting tool. Thus the manufacturing cost of the cavity die is high. As described above, the distance (shortest distance) between the cavity surface and the flowpath is short. Therefore, the temperature-adjusting efficiency in the portion of the cavity surface near the flow path maybe different from that in the portion thereof far from the flow path, which may lead to nonuniform temperature distribution of the cavity surface. To allow the temperature distribution thereof to be uniform, it is necessary to form a plurality of annular flow paths from an upper portion of the body of the cavity die to a lower portion thereof. But as described above, it is difficult (impossible with ordinary cutting tool) to machine the annular flow path. Therefore, forming a plurality of the annular flow paths leads to increase in the manufacturing cost of the cavity die.

SUMMARY OF THE INVENTION

The present invention has been made in view of the above-described situation. Thus, it is an object of the present invention to provide a golf ball-shaping mold or cavity die that has a high temperature-adjusting efficiency, prevents temperature distribution from becoming nonuniform, and can be easily manufactured.

To achieve the object, according to one aspect of the present invention, there is provided a golf ball-shaping mold comprising a cavity die having a body and a cavity surface; a retaining plate into which the cavity die is fitted; and a flow path, for flowing a temperature-adjusting fluid therethrough, formed inside the golf ball-shaping mold. The flow path includes an inner flow path formed inside the body of the cavity die and a boundary flow path located in a boundary between the cavity die and the retaining plate.

Thus, the flow path of the mold includes the inner flow path and the boundary flow path. As heat exchange is made by both the inner flow path and the boundary flow path, the temperature adjustment of the cavity die can be accomplished favorably without using a large number of inner flow paths. Therefore, the mold can be manufactured at a low cost.

Preferably, the inner flow path is approximately linear, and both ends of the inner flow path are formed as openings on a peripheral surface of the body of the cavity die. The inner flow path can be easily formed with a cutting tool or the like.

Preferably, the inner flow path is approximately linear, and one end of the inner flow path is formed as an opening on a peripheral surface of the body of the cavity die and the other end thereof is located inside the body of the cavity die such that the inner flow path communicates with another inner flow path at the other end thereof and inclines from the other end thereof to the one end thereof along the cavity surface. The inner flow path can be easily formed with a cutting tool or the like. Further, because the inner flow path inclines along the cavity surface, it can contribute to uniformalization of temperature distribution of the cavity surface.

Supposing that a distance between the inner flow path and the cavity surface is t and that a distance between the boundary flow path and the cavity surface is T, the ratio t/T is preferably not less than 0.5 and not more than 1.5. Thereby, heat exchange can be accomplished almost equivalently by the inner flow path and the boundary flow path.

Preferably, the t which is the distance between the inner flow path and the cavity surface is not less than 6 mm and not more than 12 mm; and the T which is the distance between the boundary flow path and the cavity surface is not less than 6 mm and not more than 12 mm. Thereby, it is possible to prevent the temperature distribution of the cavity surface from becoming nonuniform.

To achieve the object, according to another aspect of the present invention, there is provided a golf ball-shaping cavity die comprising a body; a cavity surface; and an approximately linear inner flow path, for flowing a temperature-adjusting fluid therethrough, formed inside the body. The inner flow path can be easily formed with a cutting tool or the like.

BRIEF DESCRIPTION OF THE DRAWINGS

FIG. 6 is a sectional view showing another conventional golf ball-shaping mold.

DETAILED DESCRIPTION OF THE PREFERRED EMBODIMENTS

The embodiment of the present invention will be described below with reference to the drawings.

Figure 1:
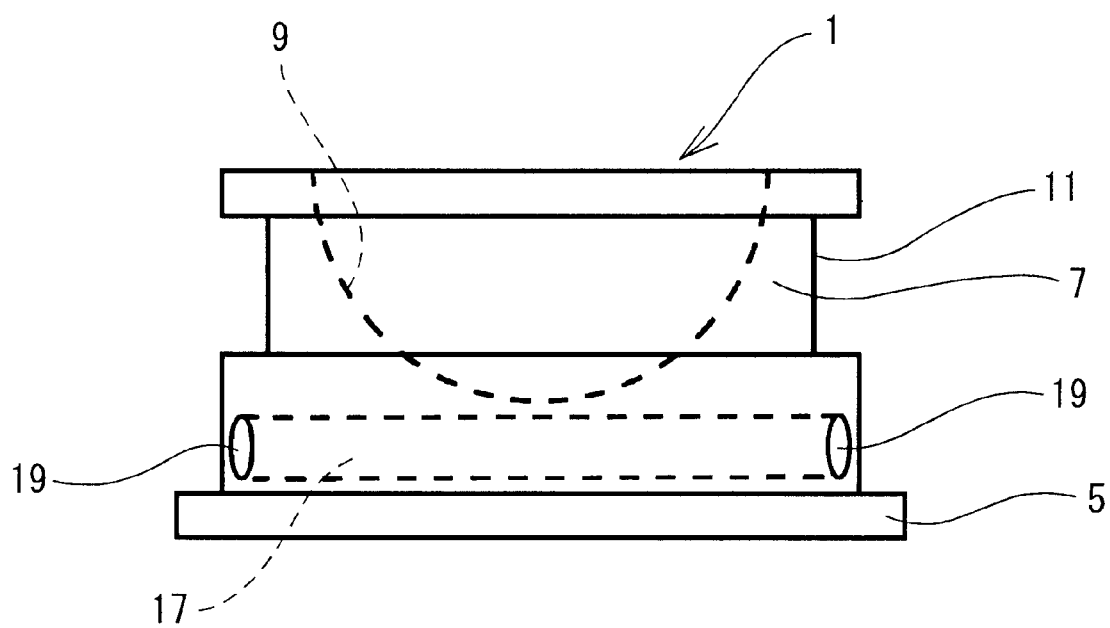
FIG. 1 is a front view showing a golf ball-shaping cavity die according to an embodiment of the present invention.
Figure 2:
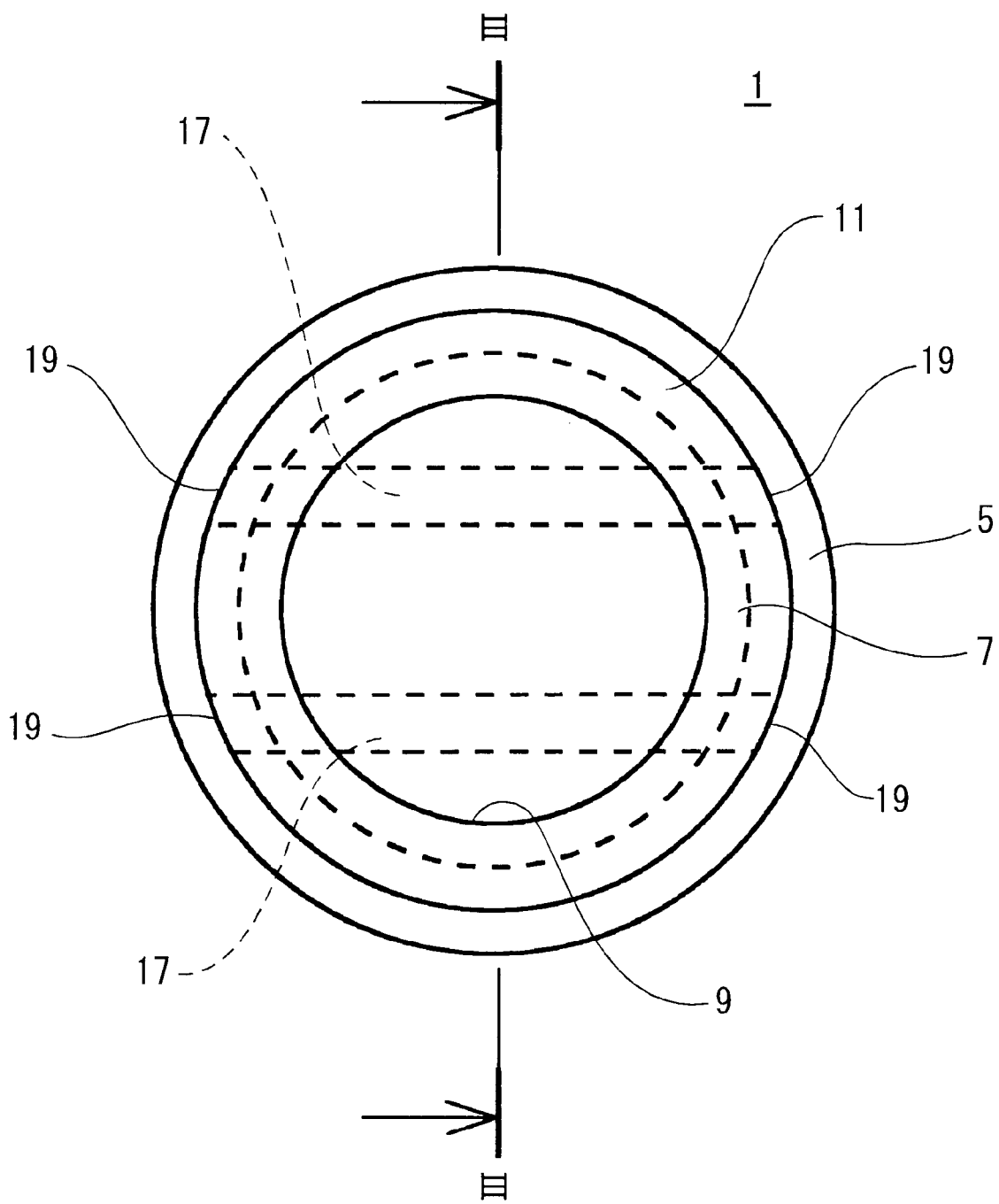
FIG. 2 is a plan view showing the cavity die shown in FIG. 1.
Figure 3:
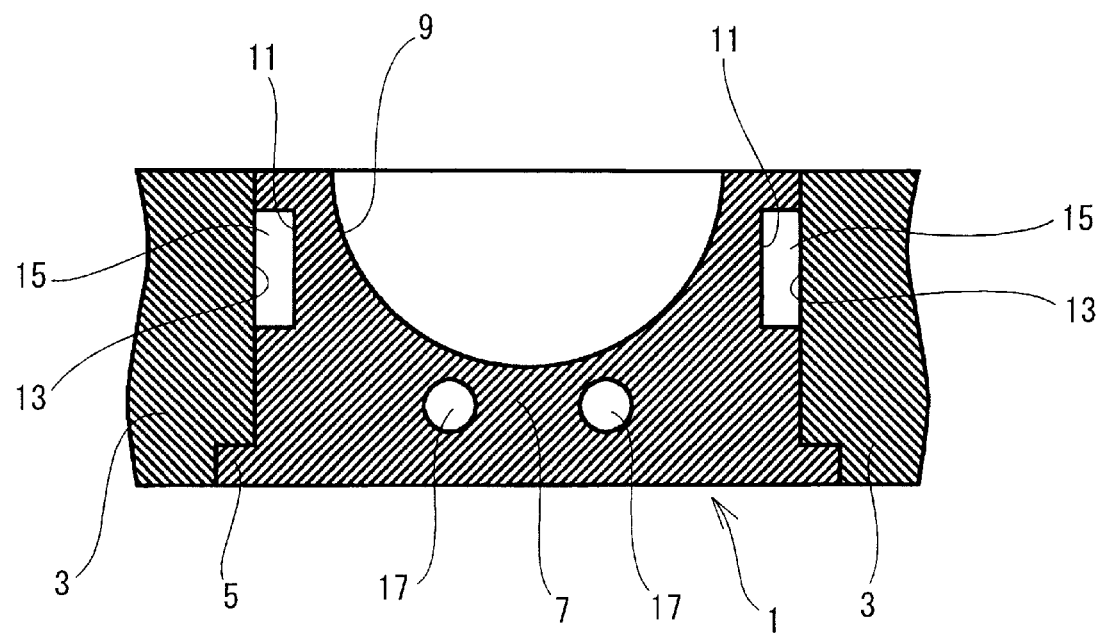
FIG. 3 is a sectional view taken along a line III—III of FIG. 2, showing a state in which the cavity die shown in FIGS. 1 and 2 is fitted in a retaining plate.

FIG. 1 is a front view showing a golf ball-shaping cavity die according to an embodiment of the present invention. FIG. 2 is a plan view of FIG. 1. FIG. 3 is a sectional view taken along a line III—III of FIG. 2, showing a state in which the cavity die 1 shown in FIGS. 1 and 2 is fitted in a retaining plate 3. The cavity die 1 and the retaining plate 3 constitute the golf ball-shaping mold.

As shown in FIG. 1, the cavity die 1 has a flange part 5, a body 7, and a cavity surface 9. The flange part 5 contributes to the positioning of the cavity die 1 in vertical and rotational directions, when the cavity die 1 is fitted into the retaining plate 3. The cavity surface 9 is spherical. Thus, when a pair of the upper and lower cavity dies 1 is closed, the upper and lower cavity surfaces 9 form a spherical cavity that shapes a golf ball. Accordingly, the diameter of the cavity is set equally to that of the golf ball to be obtained or set a little larger than that of the golf ball in consideration of the shrinkage which occurs in shaping the golf ball.

An annular groove 11 is formed on the periphery of the body 7. As shown in FIG. 3, the annular groove 11 and the inner peripheral surface 13 of the retaining plate 3 form a closed region. The closed region constitutes a boundary flow path 15. A heating medium flows into the boundary flow path 15 through a flow path (not shown) formed on the retaining plate 3. Thereby, the temperature of the cavity die 1 is adjusted. To accomplish uniform temperature adjustment of the cavity die 1, it is preferable to form the boundary flow path 15 on the entire periphery of the body 7.

Two inner flow paths 17 are formed in the body 7. As indicated in FIGS. 1 and 2, the inner flow path 17 is linear. Both ends of the inner flow path 17 are open on the peripheral surface of the body 7 to form openings 19 thereon. The inner flow path 17 can be formed easily by linearly advancing a cutting tool such as a drill from one opening 19 to the other opening 19. The heating medium flows into the inner flow path 17 through a flow path (not shown) formed on the retaining plate 3. Thereby, the temperature of the cavity die 1 is adjusted.

In the cavity die 1, the boundary flow path 15 adjusts the temperature of the side portion (upper side in FIG. 1) of the cavity surface 9 mainly. The inner flow path 17 adjusts the temperature of the bottom portion (lower side in FIG. 1) of the cavity surface 9 mainly. Accordingly, it is possible to prevent the temperature distribution of the cavity surface 9 from becoming nonuniform. In particular, in the case where the cavity die 1 is used for injection molding, the inner flow path 17 sufficiently cools thermoplastic resin in the vicinity of the ejection pin (normally, ejection pin serves as holding pin for holding core) located at the bottom portion of the cavity die 1. Thus, the generation of the pin mark can be suppressed to a high extent.

Because the boundary flow path 15 is formed in the cavity die 1, the number of the inner flow paths 17 to be formed in the body 7 may not be large to save time and labor required to process the cavity die 1 and maintain the strength of the cavity die 1 for a long time. More specifically, the number of the inner flow paths 17 for one cavity die 1 is six or less, favorably four or less, and more favorably two or less. Similarly, to save time and labor required to process the cavity die 1, the number of the boundary flow paths 15 for one cavity die 1 is three or less, favorably two or less, and more favorably one.

Supposing that the distance (shortest distance) between the inner flow path 17 and the cavity surface 9 is t and that the distance (shortest distance) between the boundary flow path 15 and the cavity surface 9 is T, the ratio t/T is favorably not less than 0.5 and not more than 1.5 and more favorably not less than 0.9 and not more than 1.1. In this ratio, the heat exchange can be accomplished almost equivalently by the inner flow path 17 and the boundary flow path 15.

The dimension of each of the distances t and T is not less than 6 mm and not more than 12 mm and more favorably not less than 6 mm and not more than 8 mm. By setting the dimension of each of the distances t and T to the above-described range, it is possible to prevent the temperature distribution of the cavity surface 9 from becoming nonuniform, while the heat exchange efficiency is maintained. If the dimension of each of the distances t and T is less than the lower limit value of the above-described range, there may be a great difference between the temperature in the portion of the cavity surface 9 near the flow path and that in the portion thereof far from the flow path. In the case where a small number of the flow paths is set to save the manufacturing cost of the cavity die 1 (for example, one boundary flow path 15 and two inner flow paths 17 are set), a great temperature difference is generated between the above-described portions. If the dimension of each of the distances t and T exceeds the upper limit value of the above-described range, the heat exchange efficiency may deteriorate.

Figure 4:
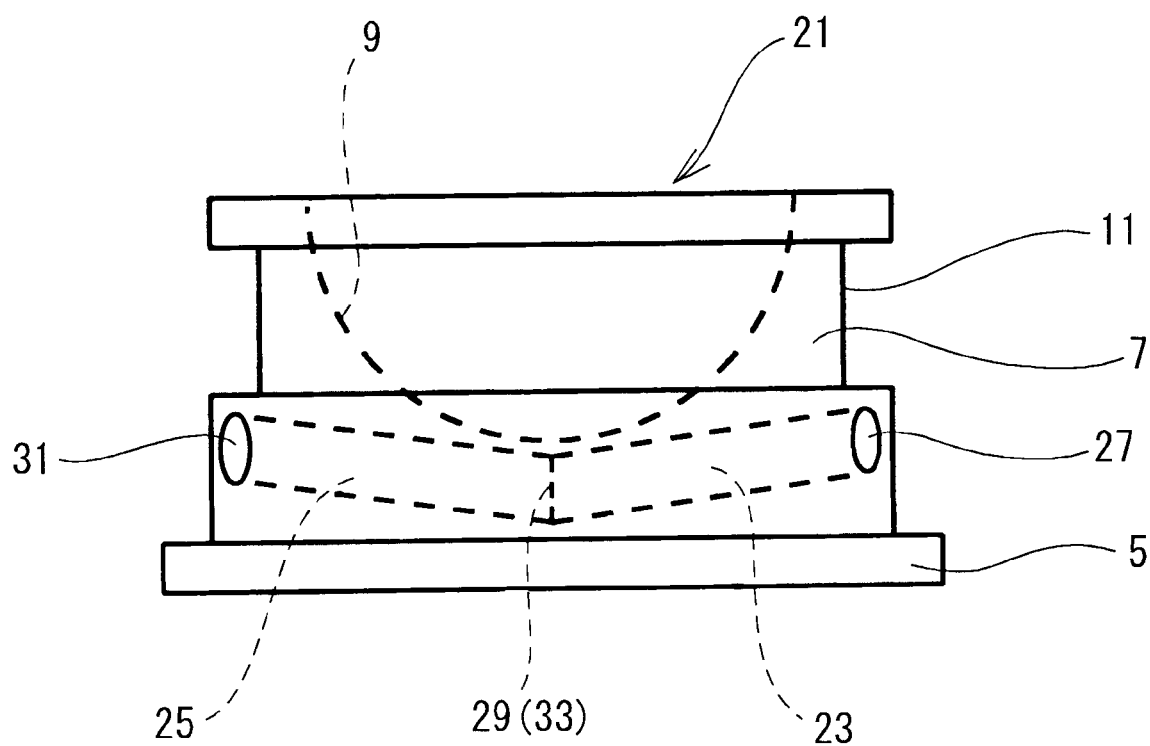
FIG. 4 is a front view showing a golf ball-shaping cavity die according to another embodiment of the present invention.

FIG. 4 is a front view showing a golf ball-shaping cavity die 21 according to another embodiment of the present invention. Similarly to the cavity die 1 shown in FIGS. 1 through 3, the cavity die 21 has the flange part 5, the body 7, and the cavity surface 9. The annular groove 11 is formed on the periphery of the body 7. Similarly to the cavity die 1 shown in FIGS. 1 through 3, the annular groove 11 and the inner peripheral surface of the retaining plate (not shown in FIG. 4) form the boundary flow path.

A first inner flow path 23 and a second inner flow path 25 are formed in the body 7. As indicated in FIG. 4, the first inner flow path 23 and the second inner flow path 25 are linearly formed, respectively. One end of the first inner flow path 23 is open on the peripheral surface of the body 7 to form an opening 27, whereas the other end 29 thereof is situated at the center of the body 7 as shown in FIG. 4. Similarly, one end of the second inner flow path 25 is open on the peripheral surface of the body 7 to form an opening 31, whereas the other end 33 thereof is situated at the center of the body 7 as shown in FIG. 4. The other end 29 of the first inner flow path 23 is coincident with the other end 33 of the second inner flow path 25. That is, the first inner flow path 23 and the second inner flow path 25 communicate with each other. A heating medium flows through the first inner flow path 23 and the second inner flow path 25. Thereby, the temperature of the cavity die 21 is adjusted. The first inner flow path 23 can be formed easily by linearly advancing a cutting tool such as a drill from the opening 27 to the other end 29. Similarly, the second inner flow path 25 can be formed easily by linearly advancing the cutting tool such as the drill from the opening 31 to the other end 33.

As indicated in FIG. 4, the first inner flow path 23 inclines upward from the other end 29 to the opening 27. Similarly, the second inner flow path 25 also inclines upward from the other end 33 to the opening 31. That is, the first inner flow path 23 and the second inner flow path 25 incline along the cavity surface 9, whereby the temperature distribution of the cavity surface 9 can be allowed to be uniform to a higher extent.

In addition to a pair of flow paths consisting of the first inner flow path 23 and the second inner flow path 25 shown in FIG. 4, another pair of flow paths is formed at the back of the flow paths shown in FIG. 4 such that another pair of flow paths is perpendicular to the sheet on which the flow paths are drawn. That is, two pairs of flow paths are formed in the body 7. To save time and labor required to process the cavity die 21, the number of the flow paths for one cavity die 21 is six pairs or less, favorably four pairs or less, and more favorably two pairs or less.

EXAMPLES

The effect of the present invention is clarified base on the examples described below. Needless to say, the present invention should not be limitatively interpreted based on the description of the examples.

Example

A cavity die 1, as shown in FIG. 1 through 3, having one boundary flow path 15 and two inner flow paths 17 was prepared and fitted into the retaining plate 3 to obtain an injection molding mold. The sectional dimensions of the boundary flow path 15 were that its length was 9 mm and its width was 5 mm. The inner diameter of the inner flow path 17 was 6 mm. The distances t and T were 7 mm and 7 mm, respectively.

First Comparison Example

Figure 5:
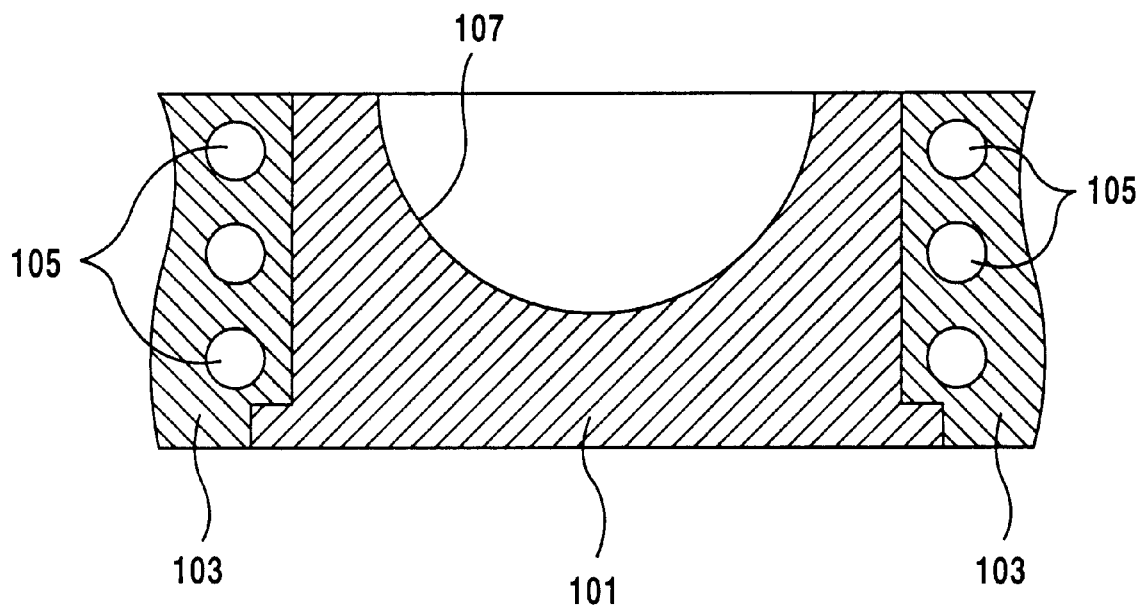
FIG. 5 is a sectional view showing a conventional golf ball-shaping mold.

The injection molding mold of the first comparison example was as shown in FIG. 5 and had three flow paths 105 formed on the retaining plate 103. The inner diameter of the flow path 105 was 5 mm. The shortest distance between the flow path 105 and the cavity surface 107 was 15 mm.

Second Comparison Example

An injection molding mold of the first comparison example was as shown in FIG. 6 and had one flow path 117 formed at the boundary between the body 113 of the cavity die 109 and the retaining plate 111. The sectional dimensions of the flow path 117 were that its length was 9 mm and its width was 5 mm. The shortest distance between the flow path 117 and the cavity surface 119 was 7 mm.

Third Comparison Example

Figure 7A:
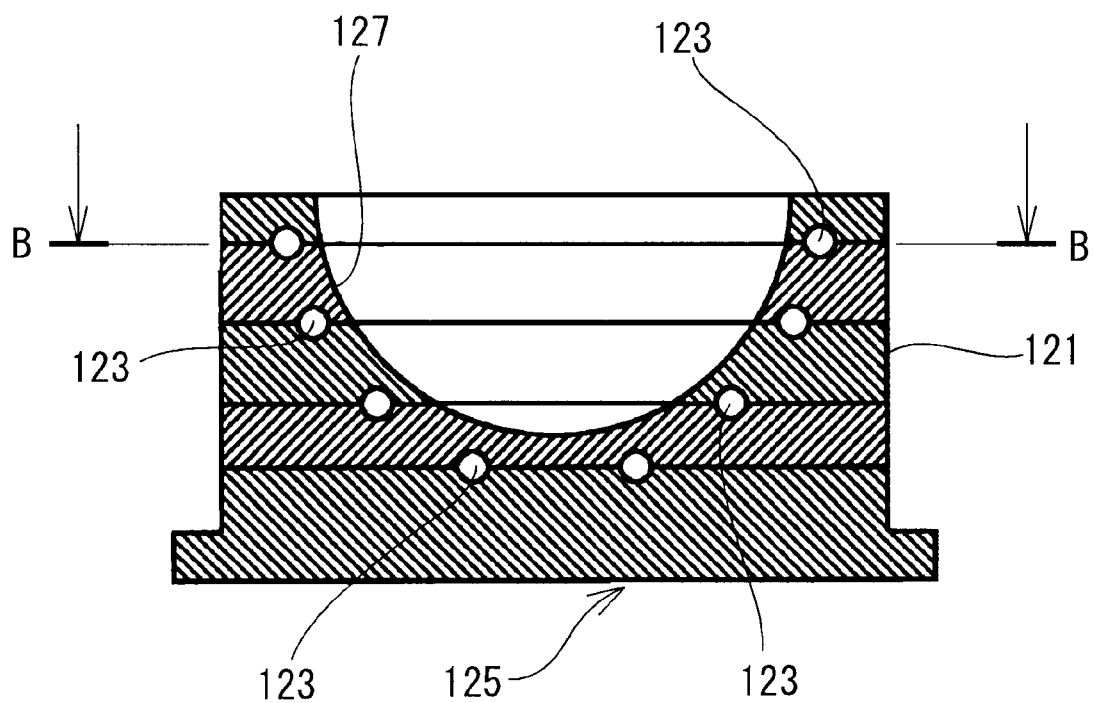
FIG. 7A is a sectional view showing golf ball-shaping die of a comparison example.
Figure 7B:
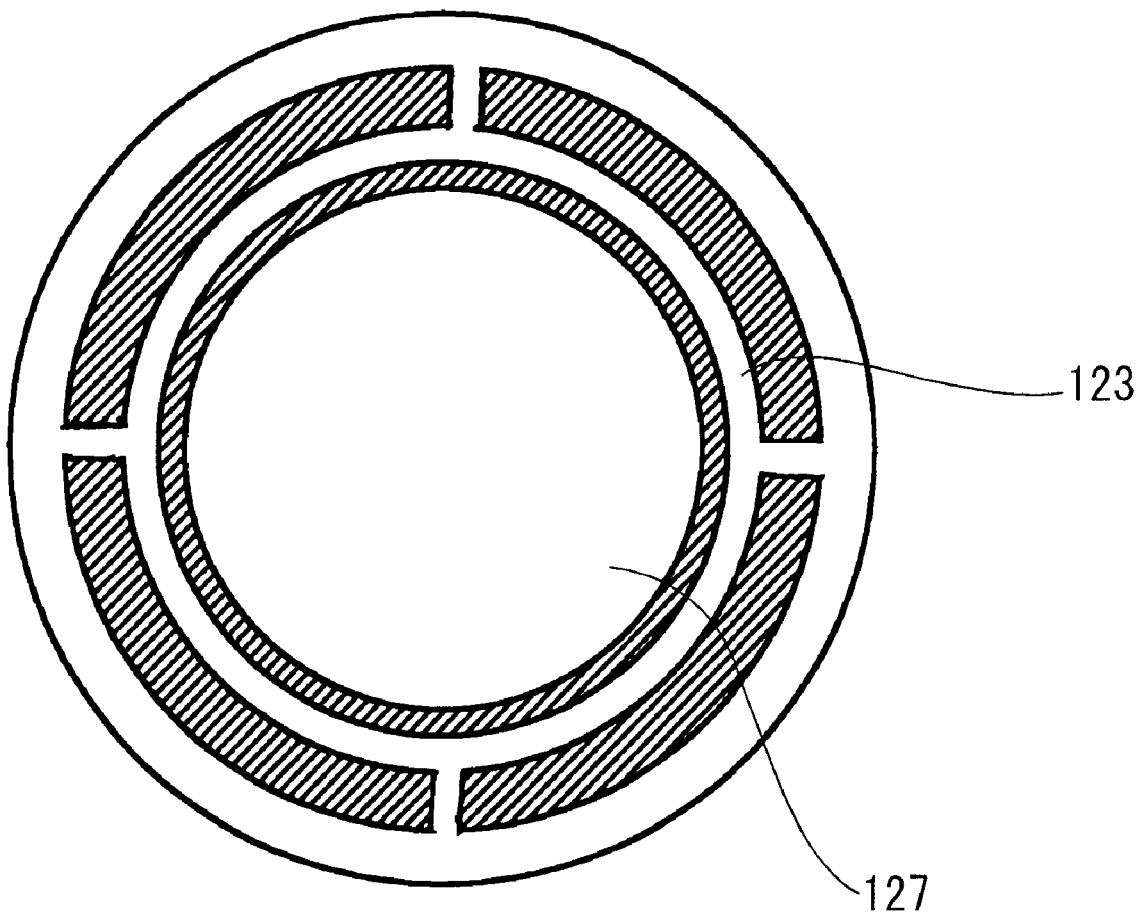
FIG. 7B is a sectional view taken along a line B—B of FIG. 7A.

The cavity die 125, as shown in FIG. 7A, having eight flow paths 123 formed on the body 121 was prepared and fitted into a retaining plate to obtain the injection molding mold of the third comparison example. The flow path 123 was annular, as shown in FIGS. 7B (sectional view taken along line B—B of FIG. 7A). The inner diameter of the flow path 123 was 3 mm. The shortest distance between the flow path 123 and the cavity surface 127 was 7 mm. The cavity die 125 is obtained by horizontally dividing the body 121 into five portions, cutting each of the five portions to form the flow path 123 thereon, and joining the five portions with one another (so-called split mold)

Check of Pin Mark

Using the mold of the example and the comparison examples, a two-piece golf ball was formed by the injection molding method while water of 20° C. was flowing at a rate of five liters per minute. The diameter of the core of the obtained golf ball was about 39 mm and the thickness of the cover thereof was about 1.9 mm. More specifically, with the core consisting of crosslinked polybutadiene rubber held in the center of the cavity, melted thermoplastic resin of 240° C. was injected around the core. The thermoplastic resin used was ionomer resin (mixture of "Highmilan 1706" and "Highmilan 1605" produced by Mitsui Dupont Chemical Inc. by mixing the two components at 50:50 in weight ratio). After the injection was completed, the golf ball was cooled, with the golf ball kept in the mold closed for a predetermined period of time. The cooling time period was fluctuated between 10 seconds and 50 seconds. After the cooling of the golf ball terminated, the mold was opened and the golf ball was ejected with five ejection pins to release the golf ball from the cavity die. Whether a pin mark were generated on the surface of the golf ball was visually checked. Shown below are shortest cooling time periods in which pin mark was not generated in the mold of the example and the comparison examples.

| Example | First CE | Second CE | Third CE |
|---|---|---|---|
| 20 seconds | 35 seconds | 28 seconds | 20 seconds |

Where CE is comparison example.

The result of the pin mark test indicates that the mold of the embodiment had a higher temperature-adjusting effect than the mold of the first and second comparison examples. The mold of the third comparison example had a temperature-adjusting effect equivalent to that of the mold of the embodiment. But the mold of the third comparison example was a split mold. Thus, burrs were generated on portions, of the surface of the golf ball, corresponding to the boundary between divided portions of the mold. Such a golf ball has a low commercial value. Further, much time and labor are required to produce the mold of the third comparison example.

The present invention has been described in detail by exemplifying the injection molding of the two-piece golf ball. The mold of the present invention has a high temperature-adjusting efficiency, prevents temperature distribution from becoming nonuniform, and can be easily manufactured. Thus, it is possible to use the mold to shape a multi-piece golf ball, a thread-wound golf ball, and a one-piece golf ball. Further, the mold can be used not only in the injection molding method, but also in the compression molding method.

As apparent from the foregoing description, the golf ball-shaping mold and cavity die of the present invention has a high temperature-adjusting efficiency, prevents temperature distribution from becoming nonuniform, and can be easily manufactured. It is possible to produce a high-quality golf ball at a low cost by using the golf ball-shaping mold and cavity die of the present invention.

What is claimed is:

1. A golf ball-shaping mold comprising:

a cavity die having a body and a cavity surface;

a retaining plate into which said cavity die is fitted; and a flow path, for flowing a temperature-adjusting fluid therethrough, formed inside said golf ball-shaping mold, wherein said flow path includes an inner flow path formed inside said body of said cavity die and a boundary flow path located in a boundary between said cavity die and said retaining plate.

2. The golf ball-shaping mold according to claim 1, wherein said inner flow path is approximately linear, and both ends of said inner flow path are formed as openings on a peripheral surface of said body of said cavity die.

3. The golf ball-shaping mold according to claim 1, wherein said inner flow path is approximately linear; one end of said inner flow path is formed as an opening on a peripheral surface of said body of said cavity die and the other end thereof is located inside said body of said cavity die such that said inner flow path communicates with another inner flow path at the other end thereof and inclines from said other end thereof to the one end thereof along said cavity surface.

4. The golf ball-shaping mold according to claim 1, wherein supposing that a distance between said inner flow path and said cavity surface is t and that a distance between said boundary flow path and said cavity surface is T, the ratio t/T is not less than 0.5 and not more than 1.5.

5. The golf ball-shaping mold according to claim 1, wherein t which is a distance between said inner flow path and said cavity surface is not less than 6 mm and not more than 12 mm; and T which is a distance between said boundary flow path and said cavity surface is not less than 6 mm and not more than 12 mm.

* * * * *